Nov. 25, 1969 W. B. SHUTE 3,480,017
CERVICAL DILATOR
Filed April 5, 1967 6 Sheets-Sheet 1

Inventor
Wallace B. Shute
By Cushman, Darby & Cushman
Attorneys

Nov. 25, 1969   W. B. SHUTE   3,480,017
CERVICAL DILATOR
Filed April 5, 1967   6 Sheets-Sheet 2

Inventor
Wallace B. Shute
By Cushman, Darby & Cushman
Attorneys

Nov. 25, 1969  W. B. SHUTE  3,480,017
CERVICAL DILATOR

Filed April 5, 1967  6 Sheets-Sheet 4

Inventor
Wallace B. Shute
By Cushman, Darby & Cushman
Attorneys

Nov. 25, 1969  W. B. SHUTE  3,480,017
CERVICAL DILATOR

Filed April 5, 1967  6 Sheets-Sheet 5

Inventor
Wallace B. Shute
By Cushman, Darby & Cushman
Attorneys

United States Patent Office 3,480,017
Patented Nov. 25, 1969

3,480,017
CERVICAL DILATOR
Wallace B. Shute, 300 Island Park Drive,
Ottawa, Ontario, Canada
Filed Apr. 5, 1967, Ser. No. 628,727
Claims priority, application Canada, Apr. 27, 1966,
958,955
Int. Cl. A61m 29/02, 7/02
U.S. Cl. 128—344      11 Claims

ABSTRACT OF THE DISCLOSURE

A cervical dilator comprising a fluid-tight container formed from a flexible material and insertable in a collapsed state into the cervical canal, inlet means in said container for allowing intermittent introduction of fluid under pressure to alternately inflate said container such that a peripheral radial wall of said container expands radially to directly contact the walls of said canal and deflate said container so as to cause dilatation of the cervix and simulate the effects of labour contraction, the ends of said container being adapted to limit axial expansion of said container during inflation and the peripheral wall of said container having a portion intermediate the ends thereof providing a waist portion of reduced dimensions in the freely inflated state of said container for location and retention of the edges of the cervical os during inflation and deflation of the container when inserted into the cervical canal.

---

This invention relates to a cervical dilator replacing the dilating action of labour pain and thus hastening the processes of Nature.

During labour, the cervix uteri dilates equally in all directions from a diameter of 0 cm. to 10 cm. under the pressure of intermittent uterine contractions transmitted through the presenting part (head, breech and/or forebag of waters). This permits passage of the baby from the uterine cavity through the pelvis, to delivery. Nature, however, does not produce such labour pains in any regular or standard pattern, since the anatomical and physiological characteristics of all women vary. Labour can be remarkably efficient and short or, with non-effective contractions extremely protracted.

It is the object of the present invention to provide a simple and relatively inexpensive device which will reproduce the effect of labour pains more efficiently and accurately regulate the dilation of the cervix, from 0 cm. to 10 cm. with safety, thus hastening the first stage of labour.

Accordingly, the present invention relates to a cervical dilator including a collapsible, hollow, cylindrical container formed by a pair of disc-like end walls connected together by a peripheral wall and adapted to be inserted, when in its collapsed state, into the canal of the cervix; said container being formed of a fluid impervious material; and means for admitting fluid under pressure to the interior of said container to inflate the latter when in position; said means permitting later discharge of said fluid from said container with the consequent deflation of the latter, to permit removal of said container from the cervix; said container thereby causing dilation of the cervix, under the direct control of the operator and with intermittent pressures, to simulate effects of labour contractions.

The invention is illustrated in the accompanying drawings in which.

Figure 1:
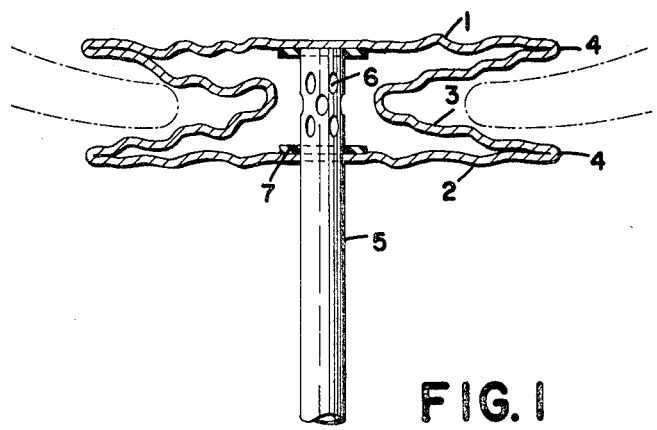
FIGURE 1 is a section through one form of cervical dilator shown in position with respect to the cervix and in its collapsed form.
Figure 2:
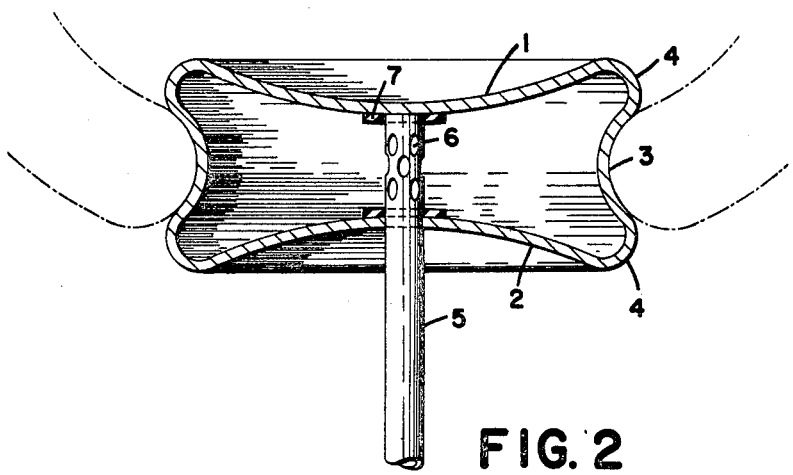
FIGURE 2 is a similar view to FIGURE 1, but showing the dilator in its distended form.
Figure 3:
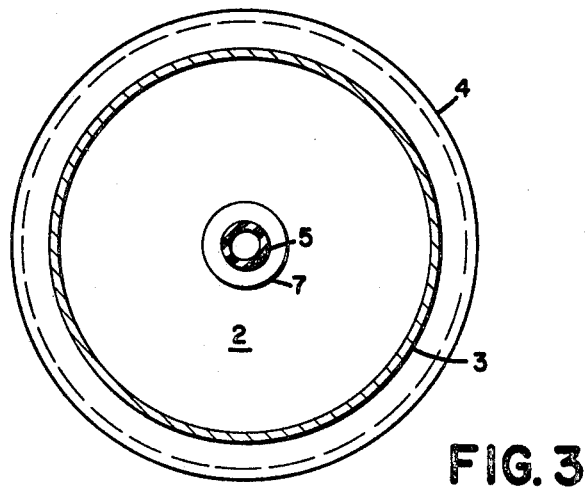
FIGURE 3 is a transverse section of FIGURE 2.

Referring now to the drawings and in particular, to FIGURES 1 to 3, the cervical dilator includes a collapsible hollow cylindrical container formed by a pair of disc-like end walls 1, 2 integrally connected together, and spaced apart when in operative position, by a peripheral wall 3, said walls preferably being formed from a fluid impervious material or fabric such as, for example, rubberized Egyptian cotton.

Means are provided for admitting fluid, under pressure, to the interior of the container for inflating the latter, said means comprising a collapsible tube 5 one end of which is located within, and secured to, the container. The said end of the tube 5 is provided with a plurality of apertures 6 which permit the fluid to enter, and be discharged from, said container when required. Moreover, the said end of the tube is also provided with sealing gaskets 7. The other end of the tube is connected to any suitable power means (not shown) such as, for example, a pump which will pump the fluid into, or out of, the container under controlled hydrostatic pressure. The fluid can either be sterile water or a saline solution.

In operation, a first dilator capable of expansion from 0 cm. to 5 cm. is inserted in its collapsed or undilated form (see FIGURE 1) into the cervical canal (indicated in chain lines) and inflated by means of the admission of fluid. This will cause the dilator, under the application of intermittent hydrostatic pressure, eventually to assume a diameter of a maximum of 5 cm. within the cervical canal, as is shown in FIGURE 2 where, as will be seen, the cervical os will be located between the peripheral edges 4 of the end walls 2, 3. Coincidentally, the cervix will become effaced, as routinely occurs during normal labour.

After this stage of cervical dilation has been achieved, the first dilator is removed from the uterine cavity and a second dilator, capable of enlarging the cervical os to a diameter of 10 cm., is inserted in a manner similar to that described above in connection with the first dilator. The intermittent application and relaxation of pressure is repeated until the second dilator completes dilation of the cervix to a diameter of 10 cm.

As will be appreciated, after a 4 cm. dilation, the cervix will be completely effaced and at completion of dilation of the second dilator, the uterine cavity will be dilated to 10 cm. The foetal head of the baby will thus be protected from the strong pressures exerted by normal labour pains and by using adjuvant techniques for the relief of pain, the mother-to-be will be protected almost completely from the pain of the long first stage of labour.

Figure 4:
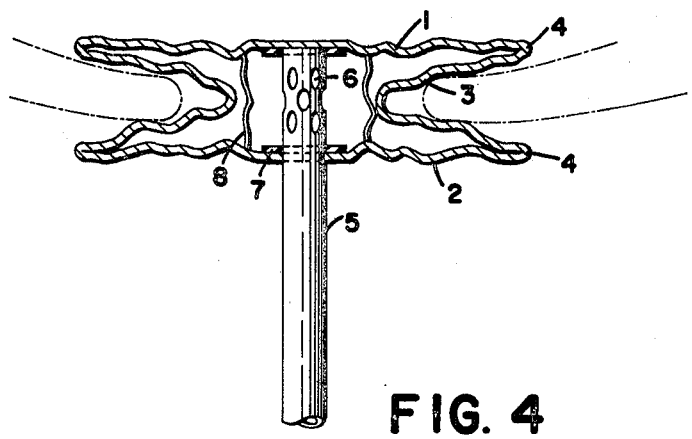
FIGURES 4, 5 and 6 are similar views to FIGURES 1 to 3, but showing an alternative form of the invention.
Figure 5:
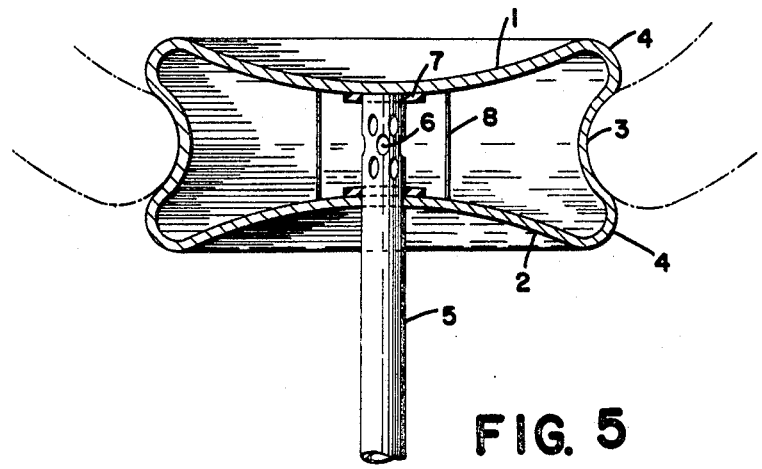
Figure 6:
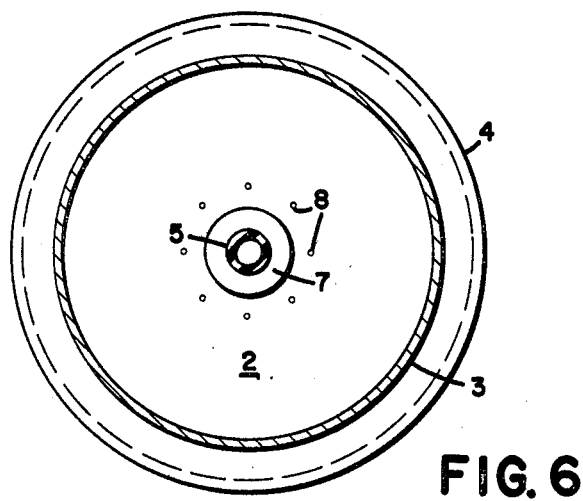

An alternative form of dilator is shown in FIGURES 4 to 6, this second embodiment of the invention being basically the same as the dilator shown in FIGURES 1 to 3, but with the addition of a plurality of thin connecting cords 8 serving to connect the disc-like end walls 1, 2 together axially and serving as a means to limit the amount of axial expansion of the container. The insertion and operation of the second embodiment of the invention is basically the same as that described above in connection with the preferred form of the invention shown in FIGURES 1 to 3.

Figure 7:
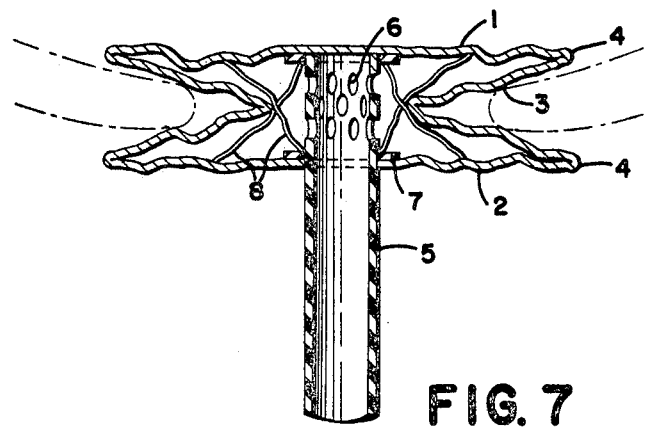
FIGURES 7, 8 and 9 are similar views to FIGURES 1 to 3 but showing a third embodiment of the invention.
Figure 8:
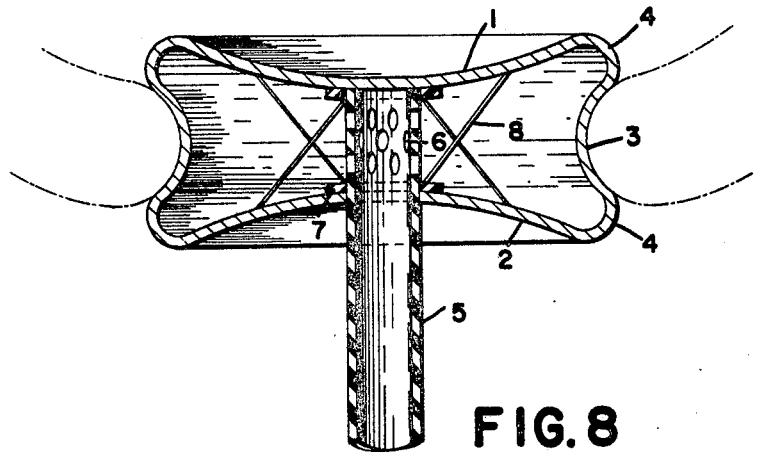
Figure 9:
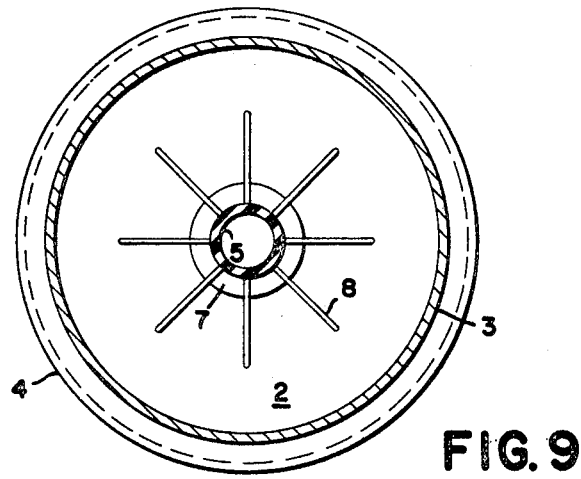

The third embodiment of the invention, shown in FIGURES 7 to 9, also includes a plurality of thin connecting cords 8 which are arranged at an acute angle to the end walls 1 and 2.

Figure 10:
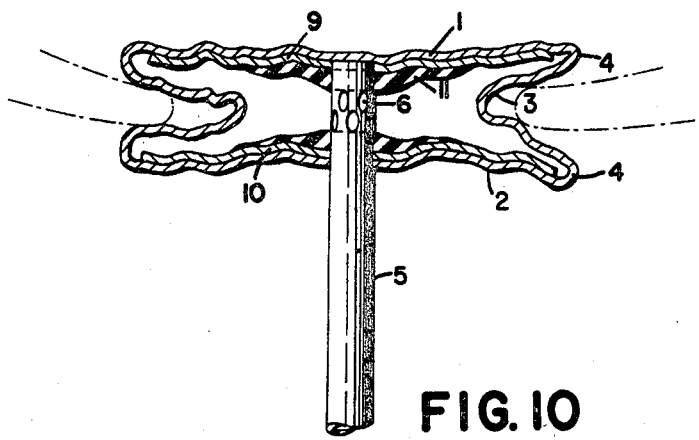
FIGURES 10, 11 and 12 are similar views as FIGURES 1 to 3, but showing a fourth embodiment of the invention.
Figure 11:
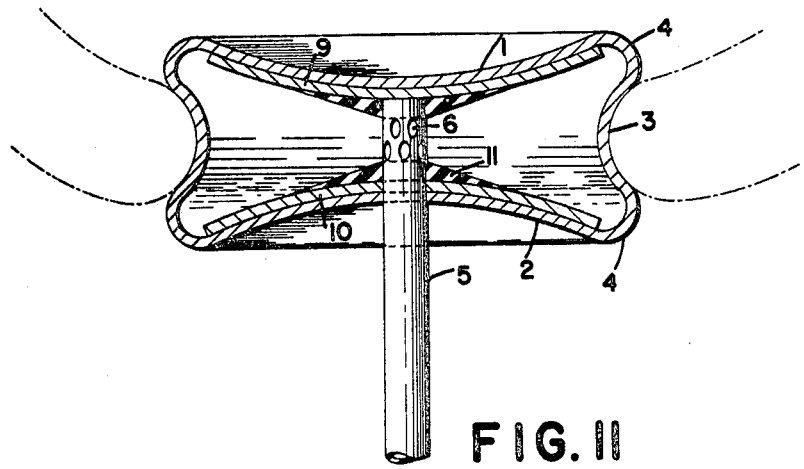
Figure 12:
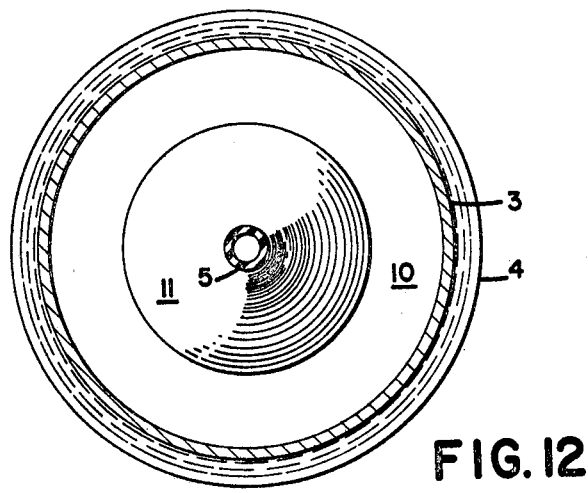

The fourth embodiment of the invention shown in FIGURES 10 to 12 is substantially similar to the previous embodiments but, as will be seen in particular from FIGURES 10 and 11, the end walls, 1, 2 are provided with inner reinforcing walls 9, 10, respectively. Moreover, the sealing gaskets 7 have been replaced with sealing gaskets 11 having a substantially frusto-conical cross-section. The purpose of the inner reinforcing end walls 9, 10 and the frusto-conical gaskets 11 is to ensure that as the dilator is inflated, the pressure will take the least line of resistance so that said pressure will tend to deflect the peripheral wall 3 radially, in the first instance, and thereafter deflect the end walls 1, 2.

It will be appreciated that the operation and function of the third and fourth embodiments is basically the same as that described above in connection with the first and second embodiments.

I claim:

1. A cervical dilator comprising a fluid-tight container formed from a flexible material and insertable in a collapsed state into the cervical canal, inlet means in said container for allowing intermittent introduction of fluid under pressure to alternately inflate said container such that a peripheral radial wall of said container expands radially to directly contact the walls of said canal and deflate said container so as to cause dilation of the cervix and simulate the effects of labour contraction, the ends of said container being adapted to limit axial expansion of said container during inflation and the peripheral wall of said container having a portion intermediate the ends thereof providing a waist portion of reduced dimensions in the freely inflated state of said container for location and retention of the edges of the cervical os during inflation and deflation of the container when inserted into the cervical canal.

2. A dilator as claimed in claim 1 in which the peripheral wall of the container has a portion intermediate the ends thereof providing a waist portion of reduced radial dimensions both in inflated and deflated state of the container.

3. A dilator as claimed in claim 1 in which the ends of said container are adapted to substantially prevent axial expansion of said container on inflation thereof.

4. A dilator as claimed in claim 1 in which the ends of said container are in the form of disc-shaped end walls joined by the peripheral wall.

5. A dilator according to claim 1, wherein said inlet means includes a tube, one end of which is located within, and secured to, said container.

6. A dilator according to claim 5, wherein said one end is provided with at least one aperture permitting said fluid to enter, and to be discharged from, said container when required.

7. A dilator according to claim 4, wherein said end walls are additionally connected together by a plurality of cord-like members located within said container.

8. A dilator according to claim 7, wherein said material is rubberized cotton.

9. A dilator as claimed in claim 1, including means for intermittently discharging liquid under pressure into said container through said inlet means to effect inflation and deflation thereof.

10. A dilator as claimed in claim 1, including hydraulic pressure means for periodically discharging liquid under pressure into said container through said inlet means to effect inflation and deflation thereof.

11. A dilator as claimed in claim 1, including hydraulic pressure means for intermittently discharging water under pressure into said container through said inlet means to effect inflation and deflation thereof.

References Cited

UNITED STATES PATENTS

| | | | |
|---|---|---|---|
| 157,343 | 12/1874 | Molesworth | 128—344 |
| 923,303 | 6/1909 | Shults | 128—344 |
| 2,499,045 | 2/1950 | Walker et al. | 128—344 X |
| 2,849,002 | 8/1958 | Oddo | 128—325 |

FOREIGN PATENTS

| | | |
|---|---|---|
| 592,104 | 4/1925 | France. |
| 629,556 | 9/1949 | Great Britain. |

DALTON L. TRULUCK, Primary Examiner

U.S. Cl. X.R.

128—361